United States Patent [19]

Baker

[11] 4,212,043
[45] Jul. 8, 1980

[54] MAGNETIC TRANSDUCING
[75] Inventor: Billy R. Baker, Redwood City, Calif.
[73] Assignee: Ampex Corporation, Redwood City, Calif.
[21] Appl. No.: 956,777
[22] Filed: Nov. 1, 1978
[51] Int. Cl.² .................. G11B 5/48; G11B 21/18; G11B 21/24
[52] U.S. Cl. ............................. 360/104; 360/109
[58] Field of Search .................... 360/109, 77, 104

[56] References Cited
U.S. PATENT DOCUMENTS

| | | | |
|---|---|---|---|
| 3,029,318 | 4/1962 | Fay et al. | 360/109 |
| 3,140,362 | 7/1964 | Cheney et al. | 360/109 |
| 3,308,450 | 3/1967 | Bourdon et al. | 360/109 |

Primary Examiner—Robert S. Tupper
Attorney, Agent, or Firm—Robert G. Clay; Charles M. Carman, Jr.

[57] ABSTRACT

A mount for holding and varying the position of a magnetic transducing head assembly comprises a pair of stiff but flexibly-hinged leaves arranged in a parallel-motion linkage. In application to a rotating head-mounting drum, the axis of each hinge is arranged to be parallel to the line of effective action of centrifugal force upon the movable portion of the mount, so as to neutralize the centrifugal force effect upon the movement of the linked leaves.

7 Claims, 7 Drawing Figures

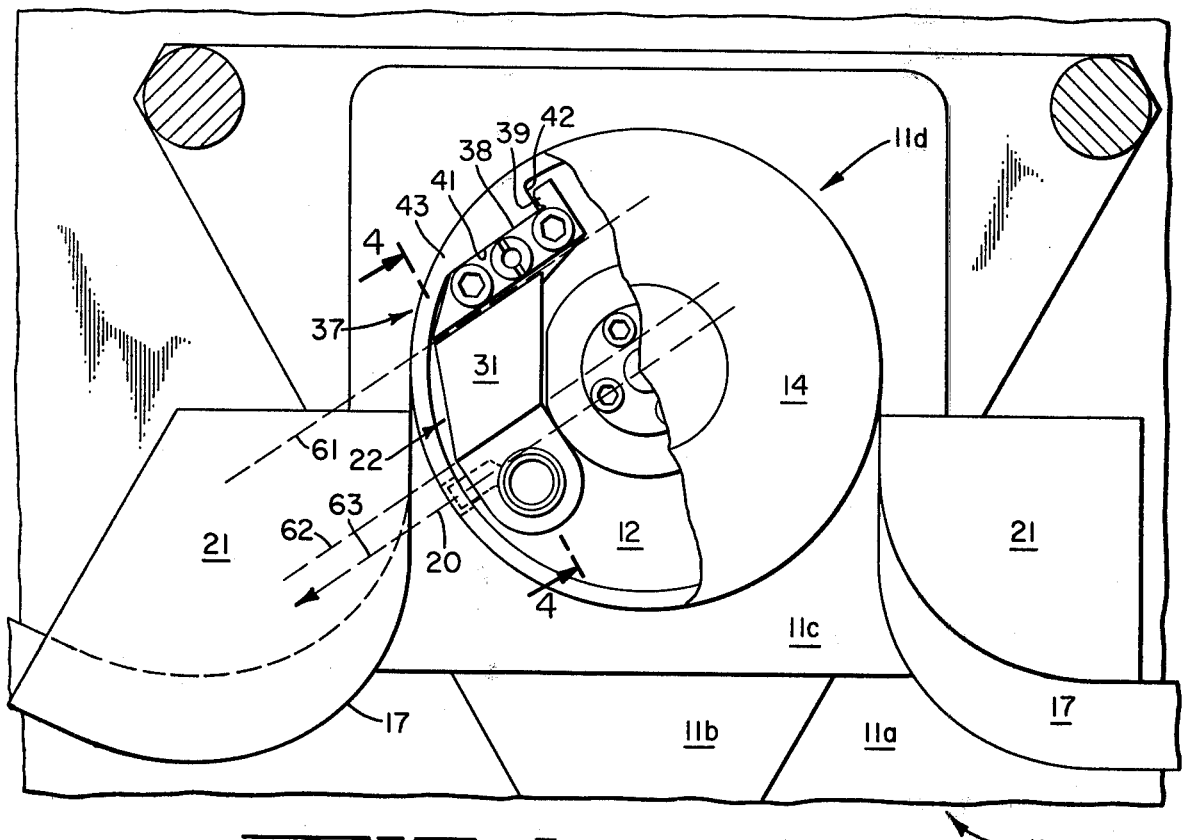
FIG_1
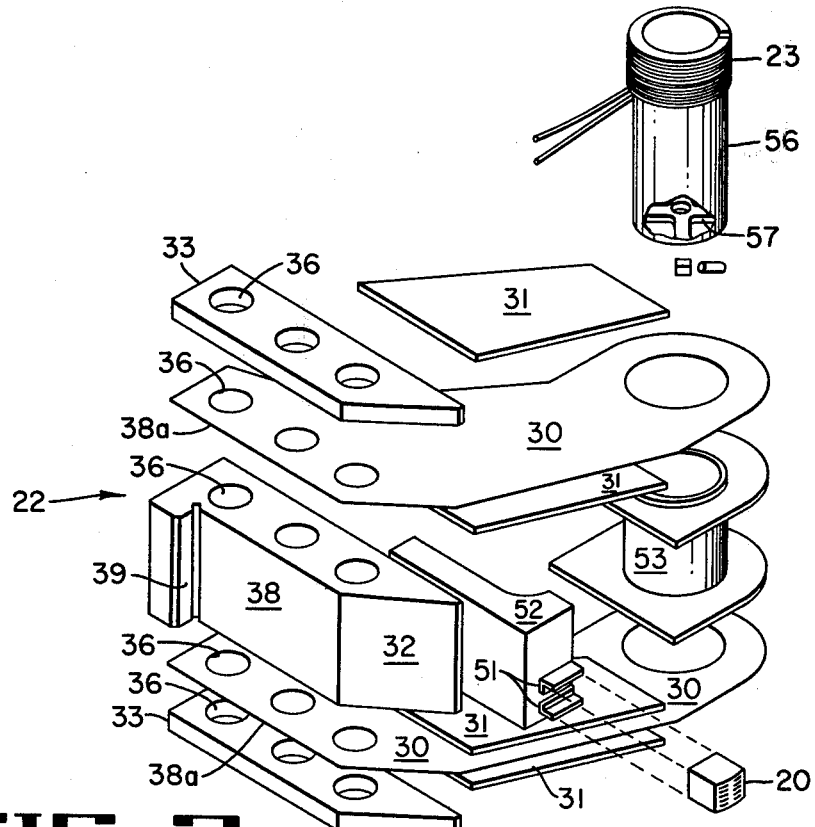
FIG_3

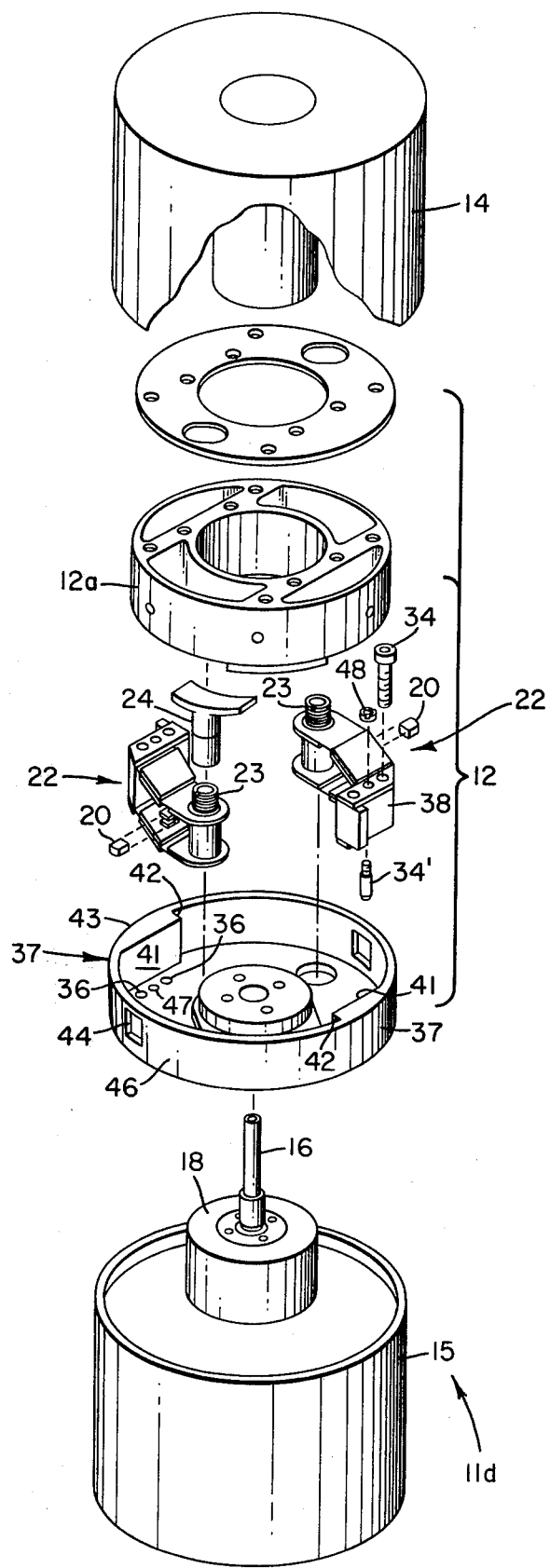
FIG_2

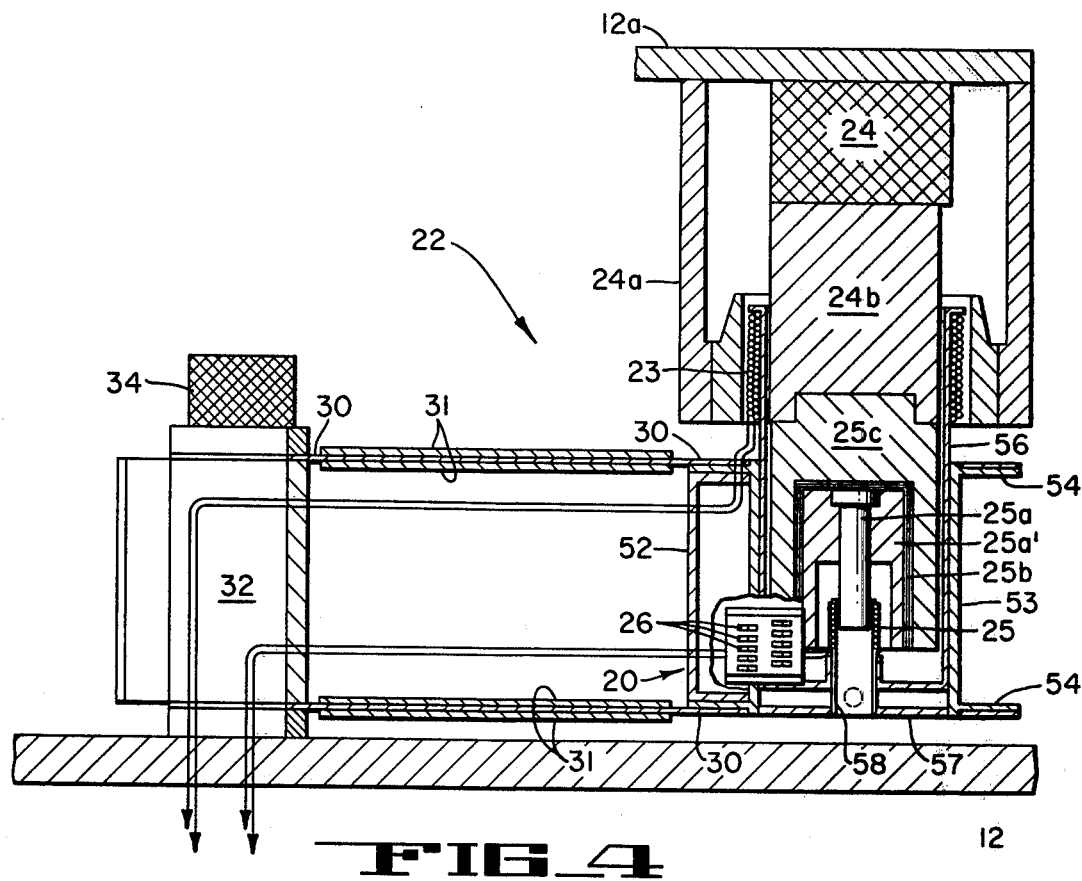
FIG_4
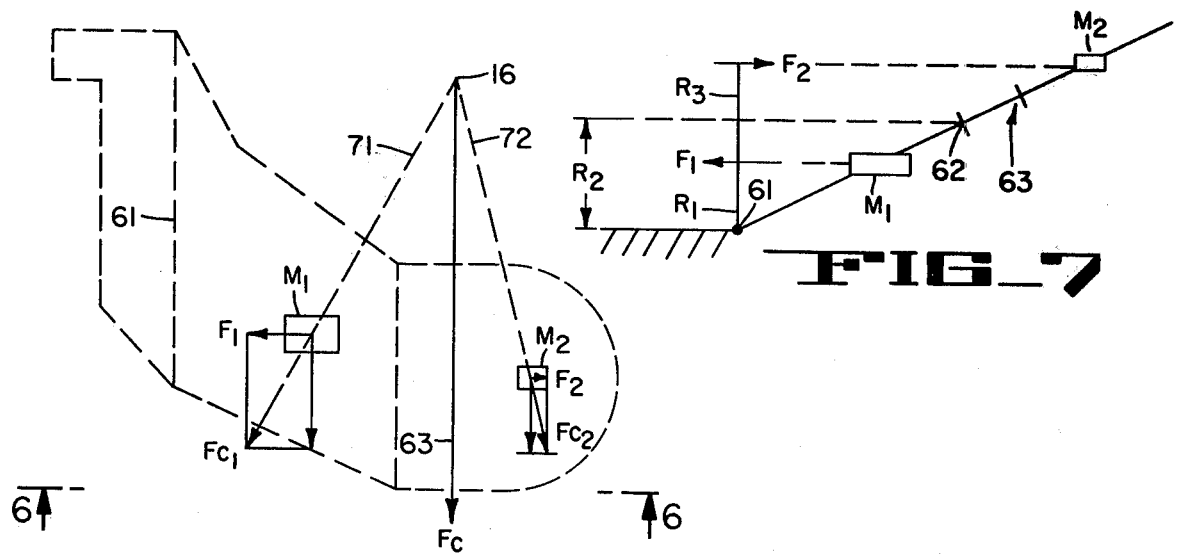
FIG_5
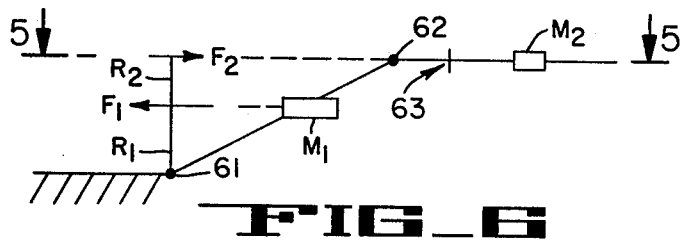
FIG_6

MAGNETIC TRANSDUCING

BACKGROUND OF THE INVENTION

This invention relates to magnetic transducing head mounts of the type permitting the head to move laterally of the general length direction of a recorded track for the purpose of following the track more accurately.

The art prior to the making of the present invention has included so-called bimorph piezoelectric or magnetically operated bending or pivoting leaf members, anchored at one end, and extending as a cantilever beam with the head assembly mounted at the free end of the beam. In the helical-scan magnetic tape transport art, one or more of these leaf-type mounts may be used, mounted usually to extend radially on a rotating drum, to cause the head to traverse or scan a magnetic tape curved around the periphery of the drum in a cylindrical shape the generatrices of which are parallel to the axis of the drum.

In such arrangements, centrifugal forces always tend to resist the desired displacement of the leaf tip and head out of the median plane thereof normal to the drum axis.

With the small and low-mass head structures of the prior art, this effect of centrifugal force was negligible. In the environment of the present invention, however, it is desired to mount a comparatively massive head stack structure containing from two to ten or more individual transducing components. For such use, the bimorph leaves of the prior art are too fragile, and even for magnetically driven leaves, the centrifugal force effect is so great that, unless it is rendered ineffective, undue amounts of power are required to move the heads, and precise control of the motion of the heads is rendered difficult or impossible to achieve.

Accordingly, it is an object of the present invention to provide a mount for positioning a magnetic transducing head on a rotating drum, wherein the action of centrifugal force is rendered entirely ineffective to aid or oppose the positioning motion of the head.

SUMMARY OF THE INVENTION

This and other objects of the invention are obtained in a mount for holding and varying the position of a magnetic transducing head, comprising a pair of stiff but flexibly-hinged leaves arranged in a parallel-motion linkage. In application to a rotating head-mounting drum, the axis of each hinge is arranged to be parallel to the line of effective action of centrifugal force upon the mount, so as to neutralize the centrifugal force effect upon the movement of the linked leaves.

DESCRIPTION OF THE DRAWINGS

FIG. 1 is a fragmentary and broken-away plan view of a magnetic tape transport of the helical scan type, incorporating the invention;

FIG. 2 is an exploded perspective view of a portion of FIG. 1, to a slightly smaller scale, illustrating the structure and assembly of the invention;

FIG. 3 is an exploded perspective view, to an enlarged scale, of a portion of the invention apparatus shown in FIGS. 1 and 2;

FIG. 4 is a cross-sectional elevation view, to an enlarged scale, of a portion of the FIG. 1 apparatus, taken along the plane of lines 4—4 of FIG. 1;

FIG. 5 is a schematic plan view illustrating the construction and operation of the invention, taken on the plane of lines 5—5 of FIG. 6;

FIG. 6 is a schematic elevation view to the same scale as FIG. 5 and taken on the plane of lines 6—6 of FIG. 5; and FIG. 7 is a further schematic elevation view illustrating a variation of the arrangement of FIG. 6.

DESCRIPTION OF THE PREFERRED EMBODIMENT

Referring now to FIG. 1, there is shown a broad band magnetic tape transport 11 comprising a tape deck 11a on which is mounted a triangular framework 11b, which in turn supports a mounting block 11c for a helical tape scanning drum assembly 11d. Referring now to both FIGS. 1 and 2, it will be seen that the drum assembly 11d comprises a rotating central drum portion 12 and stationary upper and lower portions 14 and 15, which are solidly mounted to extend from mounting block 11c, and which constitute mandrels for guiding and forming the tape 17 in a helical path around the rotating drum 12. The rotating central drum 12 is fixed to a shaft 16, which constitutes the drive shaft of a motor 18 that is mounted on the lower drum portion 15. A pair of diametrically opposed magnetic transducing head assemblies 20 are provided for the rotating drum 12, and the tape is guided by means of a pair of tilted guides 21 in a 180 degree "omega" wrap around the scanning drum assembly 11d and between a pair of tape storage and tensioning reels (not shown) of conventional type. To assist the head assemblies 20 in following various predetermined tracks on the tape, the head assemblies are each mounted for either rapid or gradual positioning motion in either of the two opposite directions substantially normal to the plane of the rotating drum 12, as by means of springy and flexibly hinged parallel-linkage assemblies 22. An electrical voice coil 23 is mounted on each assembly 22 and is coupled to means not here shown providing reversible currents of varying magnitudes causing the coil to act as the movable element of a linear motor for producing the above-described positioning motion of the head assembly 20. The stator element of the linear motor is constituted by a permanent magnet member 24, which is fixed to the upper portion 12a of rotating drum 12. The portion 12a is made of carbon steel, and also supports a tubular outer pole piece 24a circumvallating coil 23, and an inner pole piece 24b that is circumvallated by the coil 23. Also, a positional sensing coil 25 is mounted on each parallel-linkage assembly 22, circumvallating a fixed ferrite element 25a so as to provide a position sensing signal. The ferrite element 25a is mounted in an aluminum bushing ≅a' within a shielding cup 25b, made for example, of magnetic shielding conetic material; and the cup in turn is mounted on an aluminum extension member 25c, attached to the end of pole piece 24b. The circuits needed to produce the linear motor driving current and the position sensing signal receiving means form no part of the present invention, and may be conventional as in the prior art; however, in the apparatus in which the invention was actually used, these circuits were substantially as described in co-pending U.S. Patent Application Ser. No. 956,816, entitled "Servo System for Positioning a Movable Transducing Head Assembly" by the same inventor, filed concurrently herewith.

Now it will be seen that, as shown in FIG. 4 and as disclosed in greater detail in the above-referenced copending application Ser. No. 956,816, the head assemblies 22, which are to be reciprocatingly moved by the present invention, each comprise up to ten or more individual magnetic poleand-gap structures 26, each electrically isolated from the others and constituting a separate magnetic transducing head structure. The mass of this "head stack" 20 is far greater than that of the individual transducer structures that have in the prior art been reciprocated satisfactorily, as by means of single leaf structures consisting of bending piezoelectric "bimorph" assemblies or pivoting magnetically driven elements. It is also true that the lateral displacements required in a multiple-head stack are greater, and lie generally outside the displacement capability, of the prior art bimorph leaf. The head stack 20 actually weighs only a few hundreths of an ounce (e.g., about 1 gm.), but under the centrifugal forces that are generated during operation, the equivalent mass of such a head stack can be in the neighborhood of 22 lbs. (9.97 kg.). If such a mass were to be fixed at the tip of a bimorph leaf of the prior art, which bends in a characteristic circular arc (see co-pending U.S. Pat. No. 4,151,569 ), or in an S-shape consisting of two oppositely curving circular arcs (see U.S. Pat. No. 4,099,211), then the leaf would tend to be pulled out straight, or nearly straight, by the effect of the centrifugal forces acting on the head stack mass at the tip of the leaf. This effect would have at least these bad results. First, the degree of straightening would vary for different rotational speeds of the drum, with consequent variations in the contact of head and tape, or of the penetration of the head into the tape. A second bad effect would be a sharp increase in the degree of curvature at the point where the bimorph leaf is anchored to the drum structure, resulting in abnormal concentration of stress and rapid failure or short life for the bimorph leaf structure. Furthermore, as will be discussed further below, the desired flexing movement of such a bimorph leaf structure out of the plane of the drum is opposed by an axially directed component of the centrifugal force, whenever the bimorph leaf is out of the drum plane, and the motor forces that may be generated by bimorph structures of the prior art are too small to be used efficiently against the centrifugal force components generated by comparatively massive head stack structures such as those for which the present invention is intended.

In the present invention therefore, in order to avoid the straightening-out effect of the leaf described above, the leaf is constructed as an already-straight member of great rigidity and stiffness, except at flexure points adjacent the base and adjacent the magnetic head stack, where the structure operates as a springy flexure hinge and is made of materials that are adapted to withstand stress and fatigue, so as to provide cohesive strength and long life for the combination. Also, two leaves are used, in parallel-motion linkage arrangement, in order to keep the massive head stack correctly oriented during operation.

Accordingly, as shown in FIGS. 3 and 4, the two leaves are formed as members 30 of thin "Elgiloy" spring material, reinforced by aluminum stiffening members 31, and anchored at the base in a clamping structure consisting of a central spacing block 32 and two sandwiching clamping plates 33, all of aluminum. All of the named parts may be assembled and permanently attached where needful by means of epoxy adhesive. The assembly is clamped together and to the drum 12 by means of three stainless steel bolts 34 passing through conforming holes 36 in the elements and threaded into the structure of the rotating drum main (stainless steel) disc 37 (also FIG. 2). Actually, the holes 36 (except in the disc 37) are substantially larger in diameter than the bolts 34, so that the bolts function only as clamping bolts; and the base structure is accurately positioned in the plane of disc 37 as by means of orthogonally related gauge surfaces 38 and 39 formed on the spacing block 32, which surfaces are arranged to engage mating gauge surfaces 41, 42 formed on the inner side of a peripheral flange 43 of the disc 37. The spring members 30 also have edge surfaces 38a dimensioned to lie in the same plane as surface 38, to act as positioning edges for the assembly. The surface 41 is formed parallel to the radial plane of the head stack 20 that passes through the drum axis, so that as the block 32 slides or is slidably adjusted along this surface, the head stack 20 is moved radially in or out through a window opening 44, so as to be adjusted for correct radial position with respect to the outer peripheral surface 46 of the drum and to the tape 17. This position can be accurately achieved and maintained by means of shims (not shown) placed between the gauge surface 39 of block 32 and guage surface 42 of the disc 37 prior to tightening the clamping bolts. Alternatively, the middle bolt 34 can be formed as a conically tapered screw 34' (FIG. 2) threaded into the middle opening 36 of block 32 and projecting into a conical recess 47 in the disc 37 so that as the screw is screwed in or out, a camming action takes place to position the assembly parallel to gauge surface 41 to position the head stack, prior to tightening the other two bolts 34. A brass locking nut 48 can be provided to lock the tapered screw 34' in its adjusted position.

As best shown in FIGS. 3 and 4, the head stack 20 is mounted between a pair of brackets 51 extending from base housing 52, which is formed as a hollow aluminum box. The housing 52 is affixed to a linear-motor support element 53 consisting of a hollow aluminum tube formed with integral peripheral stiffening flanges 54 adjacent the ends; the ends of spring leaves 30 are affixed to the upper and lower faces of the respective flanges, and the housing 52 is affixed between the flanges. To mount the coil 23, there is provided a hollow tubular magnesium coil form 56, which is affixed within the tubular portion of support element 53. The form 56 has an integral hollowed-out spider 57 at the lower end, defining a central tubular opening into which is affixed a Nylon or Delrin (T. M. DuPont) plastic tubular form 58 for the sensing coil.

Now, it will be understood that, as previously mentioned, centrifugal forces have a certain effect on the bimorph leaf assemblies of the prior art, in that the force operates as a mement resisting the bending motion of the radially-aligned leaf assembly, whenever the leaf is bent out of its operating median plane normal to the axis of drum rotation. This moment in low-mass bimorph assemblies is negligible, but in the comparatively high-mass assembly of the present invention it can become a serious problem unless steps are taken to neutralize centrifugal effects. A second problem is that the alignment of the typical bimorph leaf structure along a radius of the drum effectively forestalls any possible attempt to turn the centrifugal forces against themselves for the purpose of neutralizing them, because the entire effect of centrifugal force on such a leaf is to form a moment tending to resist displacement of the leaf out of its axially-normal plane. A third problem solved by the present invention is that of arraying the unavoidably larger-dimensioned parallel motion linkage, and the motor and sensing structures, in the limited volumetric space of the drum 12.

All three of these problems are solved, at least in part, by positioning the length or longest dimension of each leaf 30 along a chord, or more properly a chordal arc, extending in each case for nearly a 180 degree sector of the drum (see particularly FIG. 1). This arrangement (1) makes the best use of space, and also disposes the leaf structure so that (2) centrifugal force components can be effectively turned against one another to neutralize themselves, and (3) so that the hinge bending or folding lines 61, 62 can be made to be parallel to the effective line of action 63 of the centrifugal forces, thus ensuring that the opposed component forces have the desired zero end effect on the structure. The subleties of these effects will be more clearly described in the following discussion.

First of all, the "effective line of action" of the centrifugal force is not to be understood as necessarily coincident with the radial line through the center of gravity or centroid of the moving portion of the assembly, but it may be defined as being the radial line through the leaf assembly that divides the assembly into two parts having equal moments in opposite directions about, and in a plane normal to, the base hinge line.

For example, in FIG. 1, line 61 is the base hinge line, and line 63, the "effective line of action", divides the leaf assembly into two parts. The left-hand, or clockwise, part includes all of the leaf structure extending to the hinge line 61; (and also in this case part of the head and linear-motor mounting structure 52, 53 and 54 together with the hinge line 62). The right-hand, or counter-clockwise, part consists of the remainder of the linear-motor mounting structure. Now, if the assembly is viewed schematically, as shown in FIG. 5, it may be seen that the mass of an element $M_1$ in the left-hand part may be represented as being centered along a radial line 71 representing the effective line of action of the corresponding centrifugal force $F_{c1}$ upon that element; while the mass of an element $M_2$ in the right-hand part may be represented as being centered along a radial line 72 representing the effective line of action of the corresponding centrifugal force $F_{c2}$ on that element. The magnitudes of the forces $F_{c1}$ and $F_{c2}$ may be calculated from the well-known equation $F=Ma$ in which F is the centrifugal force required to accelerate a mass M with a radial acceleration a; and the value of a is a function of the rotational velocity and the distance of the mass M from the center of rotation 16. Now each of the centrifugal forces $F_{c1}$ and $F_{c2}$ can be represented by a combination of (1) vector force components parallel to line 63 and to hinge lines 61 and 62, which force components have no moment or movement effect on the movable portion of the apparatus; and by (2) vector force components $F_1$ and $F_2$ perpendicular to the line 63 (as seen in FIG. 5) and oppositely directed. As may be seen in the corresponding elevation view of FIG. 6, these force components $F_1$ and $F_2$ act through moment arms $R_1$ and $R_2$, respectively, to tend to rotate the assembly respectively counter-clockwise ($F_1R_1$) and clockwise ($F_2R_2$) about the base hinge line 61. So long as the sum of all of these clockwise moments is equal to the sum of all the counter-clockwise moments, the net effect of centrifugal force in opposing or aiding the linear-motor 23-24 is substantially zero. In other words, the undesired effect of centrifugal force is eliminated, cancelled, de-coupled.

FIG. 7 illustrates the fact that the "effective line of action" of the centrifugal force is not necessarily the same as the center of gravity of the structure. In FIG. 7, a simple leaf is shown, divided schematically into two segments on either side of line 63 as in FIG. 6, but not having a pivoting upper end, as does the leaf of FIG. 6. In this case if the center of gravity or centroid is assumed to lie precisely upon the line 63; then the centrifugal force component $F_2$ and the sub-mass $M_2$ must have different values than they have in FIG. 5, because the moment arm $R_3$ of $F_2$ has a different value; otherwise balanced opposed moments will not result. Conversely, if the masses are the same as shown in FIG. 5, then the effective line of action of the undivided centrifugal force will no longer pass through the true center of gravity nor parallel to the hinge line 61. This effect could be remedied, of course, by re-aligning the hinge line 61. The purpose of the above discussion is merely to call to the attention of future designers the fact that the calculations for determining the "effective line of action" and the corresponding hinge alignment must assume the structure to be in its displaced condition, i.e., not co-planar with the base plane of disc 37.

In practice, the actual location of line 63, the "effective line of action of the centrifugal forces", may be determined empirically, i.e. by trial-and-error, or it may be carefully calculated, taking into consideration all of the parameters of the system.

I claim:

1. A mount for holding and varying the position of a magnetic transducing means, comprising:
    a base defining a first pair of spaced-apart hinge positions;
    a pair of leaf members having rigid body portions and terminating in a pair of first and a pair of second flexibly springily bending hinge portions, the first pair of hinge portions being fixed to said base at said hinge positions thereon; and
    a link member defining a second pair of spaced-apart hinge positions, the second pair of hinge portions being fixed to said link member at said second hinge positions;
    said transducing means being mounted on said mount remote from said base.

2. A mount for holding and varying the position of a magnetic transducing means as described in claim 1, wherein:
    second hinge positions are spaced apart for the same dimension as the first hinge positions and the effective hinge axes of all of said hinge portions are parallel to one another, so that said leaves lie constantly in planes that are parallel to one another.

3. A magnetic transducing means positioning mount of the type having a base mounted on a rotatable drum and leaf means extending from said base and mounting said transducer means adjacent a magnetic tape, comprising:
    a leaf member having a rigid body portion extending generally in a plane orthogonal to the axis of said drum, and at least one flexible springily-bendable hinge portion affixed to said base and having an effective hinge axis normal to the drum axis and displaced therefrom;
    means for mounting said magnetic transducing means on a portion of said leaf member remote from said hinge portion thereof so as to define with said leaf member and said transducing means an assembly for displacement of said transducing means in directions parallel to said drum axis;

said hinge axis also being arranged to be parallel to the plane of effective action, upon said assembly of centrifugal forces originating from the rotation of said drum;

said plane of effective action being defined as a plane containing the drum axis and dividing said assembly into two parts having equal and opposite moments attributable to said drum-originating centrifugal force, with said moments being taken about said hinge axis in a plane normal thereto.

4. A magnetic transducing means positioning mount of the type having a base mounted on a rotatable drum leaf means extending from said base and mounting said transducer means adjacent a magnetic tape, comprising:

a pair of parallel leaf members having rigid body portions, a first pair of flexible springily-bendable hinge portions affixed to said base substantially upon parallel effective hinge axes lying in a first hinge plane parallel to the drum axis, and a second pair of flexible springily-bendable hinge portions having effective hinge axes lying in a second hinge plane parallel to the first hinge plane;

a link member affixed to said leaf members by said second hinge portions thereof and mounting said magnetic transducing means so as to define with said leaf members and said transducer means an outboard parallel motion linkage assembly for displacement of said transducing means in directions parallel to said drum axis;

said first and second hinge planes being arranged to be parallel to the plane of effective action, upon said outboard assembly, of centrifugal forces originating from the rotation of said drum;

said plane of effective action being defined as a plane containing the drum axis and dividing said outboard assembly into two parts having equal and opposite moments attributable to said drum-originating centrifugal force, with said moment being taken in a plane normal to said hinge axes and about a moment axis lying in the same plane and parallel to said first hinge axes.

5. A magnetic transducer positioning mount as described in claim 4, and also including:

linear electric motor means including a permanent magnet motor element and an electric coil motor element movable substantially rectilinearly relatively thereto when electrical current is impressed in said coil, one of said motor elements being affixed to said link member and the other of said motor elements being affixed to said drum, with the substantially rectilinear direction of relative motion of said motor elements being substantially parallel to said drum axis.

6. A magnetic transducing positioning mount as described in claim 4, and also including:

position sensing means including a sensed element and a sensing element sensitive to said sensed element and providing a signal indicative of the position of said sensed element relative to said sensing element;

one of said sensed-sensing elements being mounted on said link member and the other of said sensed-sensing elements being affixed to said drum for providing a signal indicative of the displacement of said transducing means with respect to said drum.

7. A magnetic transducer positioning mount as described in claim 4, wherein:

said leaf members each include a main leaf element of flexible springily bendable material, having a body portion sandwiched between a pair of stiff and substantially unbendable plate members solidly affixed to said main leaf element to define said rigid body portion of said leaf member;

said main leaf element extending from said rigid body portion to define said first and second hinge portions.

* * * * *